H. M. PATCH.
DIFFERENTIAL POWER TRANSMISSION DEVICE.
APPLICATION FILED JAN. 15, 1917.
1,242,587.
Patented Oct. 9, 1917.
2 SHEETS—SHEET 2.
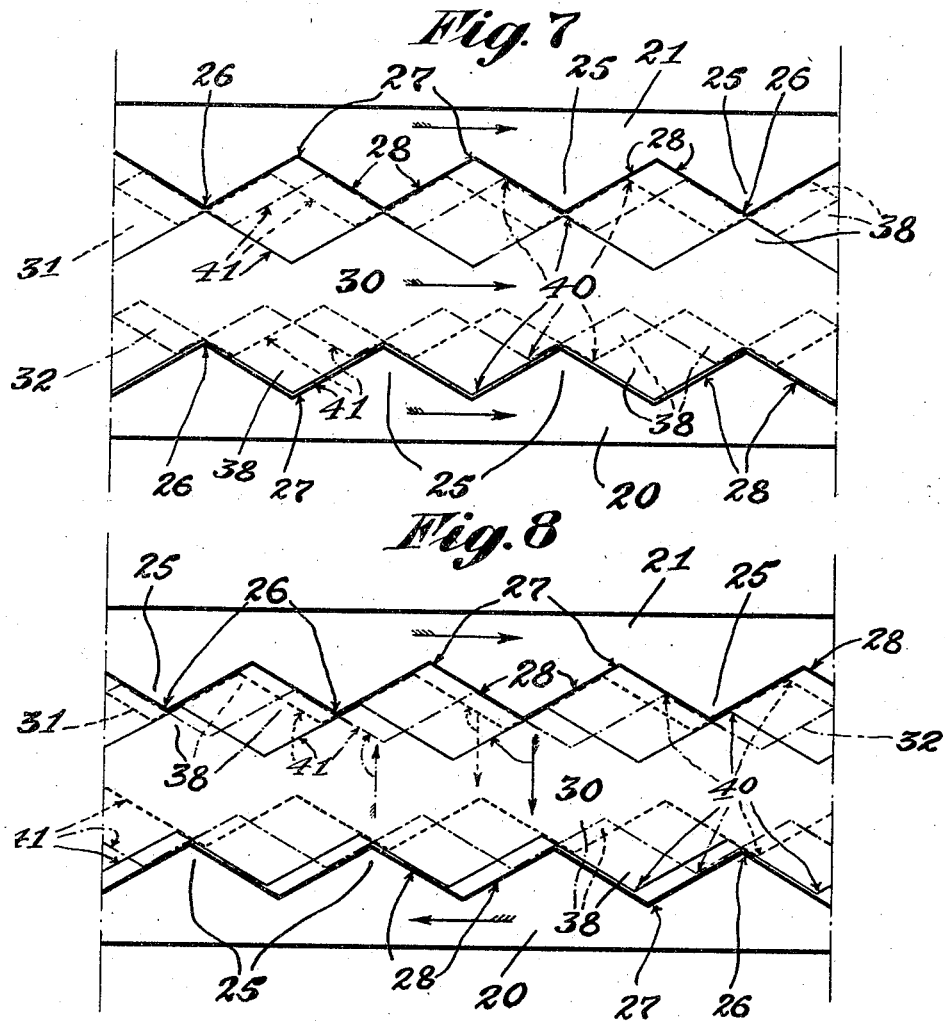
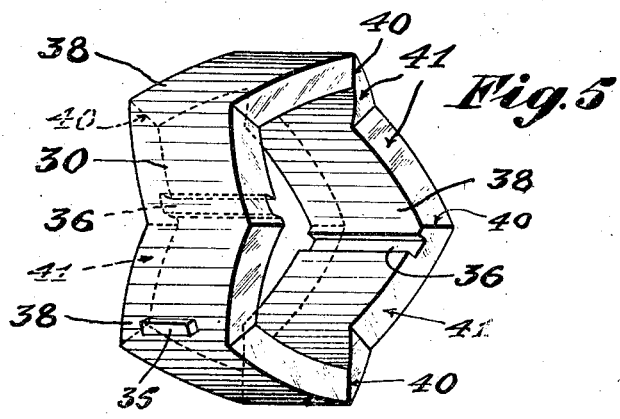
INVENTOR
Harry M. Patch.
BY
ATTORNEY.

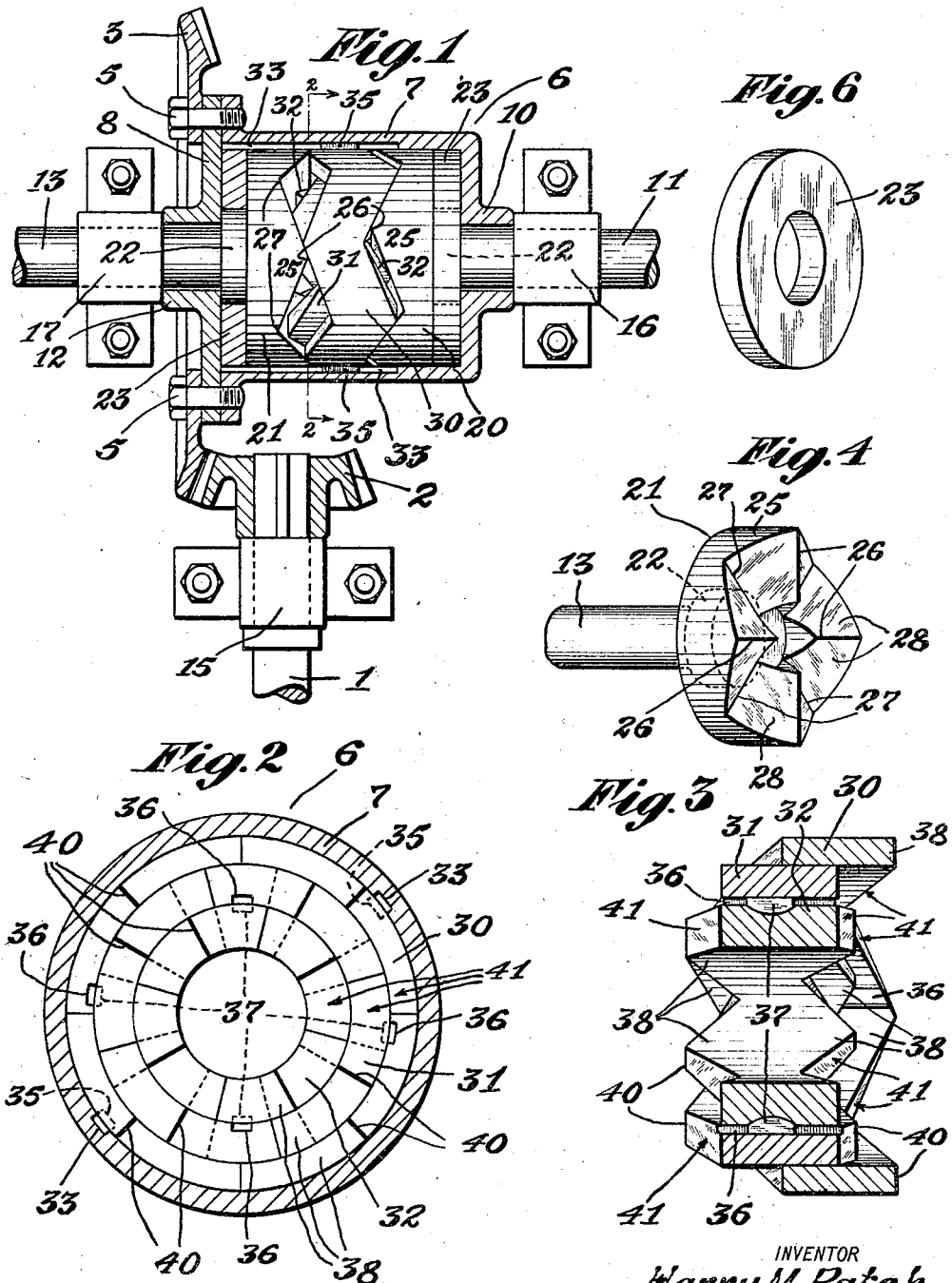

UNITED STATES PATENT OFFICE.

HARRY M. PATCH, OF SEATTLE, WASHINGTON.

DIFFERENTIAL POWER-TRANSMISSION DEVICE.

1,242,587.

Specification of Letters Patent.

Patented Oct. 9, 1917.

Application filed January 15, 1917. Serial No. 142,364.

*To all whom it may concern:*

Be it known that I, HARRY M. PATCH, a citizen of the United States, residing at Seattle, in the county of King and State of Washington, have invented certain new and useful Improvements in Differential Power-Transmission Devices, of which the following is a specification.

This invention relates to improvements in differential power transmission devices.

One of the objects of the invention is to provide simple and economically constructed apparatus for positively driving the two rear wheels of a motor driven vehicle under all conditions in either direction.

A further object is the provision of compensating mechanism that will permit either of such wheels to rotate faster than the other in either direction.

A still further object is the provision of means to prevent power being wholly or to an undue extent applied to a wheel which has lost its traction or which offers relatively little resistance.

With the above and other objects in view, the invention consists in the novel construction, adaptation and combination of parts of differential power transmission apparatus, a preferred example of which is hereinafter described and illustrated in the accompanying drawings.

In said drawings, Figure 1 is a view in longitudinal section of apparatus embodying my invention;

Fig. 2 is a cross-sectional view on line 2—2 of Fig. 1;

Fig. 3 is a view in longitudinal section of annular intermediate driving members of said embodiment;

Fig. 4 is a detached perspective view of a toothed driven element and a portion of the associated axle-part;

Fig. 5 is a perspective view of one of the driving members;

Fig. 6 is a perspective view of one of the thrust-bearing members employed in said embodiment;

Figs. 7 and 8 are diagrammatic views illustrating various relative positions of the operative mechanism of the invention.

In said views, the reference numeral 1 indicates the driving shaft of an automobile, and 2 a bevel pinion rigidly mounted thereon and meshing with a beveled gear 3 which is rigidly secured, as by screws 5, to a tubular casing indicated generally by the numeral 6.

Said casing comprises a cylindrical part 7 and a head 8 which is removably secured as by the referred to screws 5.

In the ends of said casing and disposed axially thereof are hubs 10 and 12 through which extend parts 11 and 13 of a divided axle. The numeral 15 indicates a journal box for the driving shaft 1, and 16 and 17 the journal boxes of the axle-parts 11 and 13.

Provided within the casing are circular heads 20 and 21 for said axle parts, preferably made separate and rigidly secured to the respective axle parts by keys.

Mounted upon bosses 22 between said heads and the adjacent ends of the casing are wearing or thrust members 23. The inward or opposing faces of said heads are formed to provide teeth, indicated generally by 25, having warped faces 28 disposed in angular relations to planes radially of the heads or nearly so. The protruding ridges or tooth-points 26 and the inner lines 27 between the roots of said teeth are also in radial relations to the axle axis and are both substantially parallel to a plane at right angles to such axis.

A plurality of interfitting concentrically arranged annular members as, for example, three—30, 31 and 32—are provided within the casing and between the heads 20 and 21, and are connected with each other and to the periphery of casing part 7 for relative axial movements, as by splines 37 and 35, engaging in longitudinal ways 36 and 33.

Said members are provided in their ends with angular teeth 38 of forms conforming substantially to the parts of the teeth upon the axle heads with which they coöperate, the surfaces of the engaging teeth being adapted to slide one upon the other. The teeth 38 of the respective members are spaced circumferentially thereof so that the teeth points 40 are disposed for simultaneous engagement with the teeth of the respective heads as the members are influenced by the latter in the operation of the mechanism.

With three members having four teeth each, as in the illustrated embodiment, and with the teeth points upon an end of each member at angles of 90° apart, the members are arranged to have the group of teeth at each end in angular relations of 30°. In the embodiment herein described, the high points on the upwardly facing ends of the connecting members, as shown in Figs. 7 and 8, are spaced thirty degrees apart from left to right in the following order: high point of 30, high point of 31, high point of 32, high point of 30, etc., and the high points on the downwardly facing ends are spaced thirty degrees apart from left to right in the following order: high point of 32, high point of 31, high point of 30, high point of 32, etc. In this embodiment one of the connecting members, namely member 30, has its high points one on end in line with its low points in the opposite end, and this is the preferred construction on account of strength and compactness. A different number and arrangement of teeth and of connecting members may be employed by utilizing a corresponding variation in the the teeth upon the co-acting parts.

With the parts assembled in the manner illustrated in Fig. 1, when the casing is rotated through the agency of the pinion 2 and the bevel gear 3, the members 30, 31 and 32, which have spline connections with the casing, are caused to rotate therewith and be capable of relative axial movements.

When a vehicle provided with my device is propelled in a straight direction, the heads 20 and 21 and the associated axle parts 11 and 13 are driven with the casing at the same speed, and the members 30, 31 and 32 have no axial movements relative to each other or the other parts, because forwardly inclined faces 41 of the various teeth of one or more of said members at both ends of the same are in stationary engagement with the opposing tooth-faces 28 of the heads to accordingly transmit corresponding rotary motion to both axle parts.

Such a disposition of the heads and members is illustrated diagrammatically in Fig. 7, wherein the heads 20 and 21 are represented in heavy full lines, the members 30, 31 and 32 are respectively indicated by light full lines, broken lines and dot-and-dash lines, and the arrows indicate their direction of travel.

When rounding a corner, one axle part rotates faster and the other axle part rotates slower than the speed of the casing. By reference to Fig. 8, for example, it will be seen that with head 21 upon the axle part of the faster running outside wheel, the forwardly directed inclined teeth surfaces of this head will react upon inclined faces of teeth at the adjacent ends of the members to cause the latter to be shifted axially and force the teeth at the opposite ends of the members against the opposing forwardly inclined teeth of the head 20, thereby enabling the latter to be retarded in its speed of rotation because of the increased resistance of the rearwardly directed teeth faces of said members with respect to the forwardly directed faces of the teeth of head 20. This may be understood by reference to the member 30, as shown by full lines in Fig. 8. Simultaneously, member 31 (Fig. 8) shown in broken lines, is similarly acting but in the example is shown as having greater tooth areas in contact with the forwardly directed surfaces of the teeth of the advancing head 21 and having correspondingly less contact with the teeth of head 20.

Member 32, as represented in dot-and-dash lines in Fig. 8, is illustrated as engaging the rearwardly directed faces of the teeth of both heads and in the particular position shown is capable of transmitting the entire propelling power to the wheels. As shown, the member 31 is presenting about equal tooth areas to both heads, but the advance of head 21 and the relative retraction of head 20 will cause the referred to member to be shifted toward the head 21 and increasingly bear thereagainst until its direction of travel is changed by being affected by the forwardly directed tooth faces of such head.

It is to be noted that when the teeth of a member are bearing against one head, they also bear against the other head and are subjected to the same effect, and when three members are employed but two or even one member may be operably engaged with a head at the same time.

The teeth of a member, by being equally spaced, will, however, bear equally upon the teeth of the respective heads.

From the foregoing, it is manifest that the members 30, 31 and 32 allow of differentiation in the rotary travel of the axle heads by axial reciprocatory movements therebetween, as indicated by the vertical darts in Fig. 8; while the amount of differential action is within normal limits, such as when rounding a corner or making a complete turn at a high speed of the car, the members will move axially to and fro between the heads 20, 21 and allow of complete compensatory movements of the wheels; but when the tendency of one wheel is to exceed abnormally a desirable differentiation, as by the loss of traction, the acceleration of the axial movements of the members consumes the energy due the rapid increase in the forces of inertia and friction occurring by reason of the rapid reciprocatory movements of said members, and power is consequently transmitted to the wheel that retains its traction.

I desire to be understood that my invention is not limited to any specific form or arrangement of parts except in so far as such limitations are specified in the claims.

What I claim is:

1. In apparatus for transmitting motion, two axially alined angularly toothed driven elements arranged in spaced relation, angularly toothed driving members capable of independent axial movements and interposed between said elements, and means to rotate said driving members to cause the teeth thereof to coöperate with the teeth of said elements, said members when rotated in either direction reciprocating one after the other to afford differential rotary movements to said elements when said elements are unequally retarded.

2. In an apparatus for transmitting motion, a rotatable casing, two axially alined elements mounted for relative rotary movements therein, and a plurality of annular members within said casing rotating therewith and capable of independent axial movements, said members and said elements having coöperating sliding faces for producing differential rotary movements of said elements when said casing is rotated in either direction and said elements are unequally retarded.

3. In a differential apparatus for transmitting motion, two axially alined driven elements arranged in spaced relation, and a plurality of driving members independently movable axially and interposed between said elements, said elements and members having co-acting teeth and said members being related to said elements and to each other so as to successively make engagements through their teeth with each of said elements when rotated relatively thereto, the teeth on said members and elements being provided with slide surfaces between which said engagements are made.

4. In apparatus for transmitting motion, two axially alined driven elements arranged in spaced relation and provided with teeth having slide surfaces, a plurality of driving members independently movable axially and interposed between said elements and provided with teeth having surfaces adapted to engage and slide upon said first mentioned surfaces, the teeth of one driving member being out of radial alinement with corresponding teeth of any other driving member by a fraction of the angular distance between the teeth of said driven elements, and means to rotate said driving members to enable the teeth thereof to coöperate with the teeth of said elements and reciprocate so as to permit differential rotary movements of said elements when said members are driven in either rotary direction.

5. In apparatus for transmitting motion, a rotatable casing, two axially alined elements mounted for relative rotary movements therein, a plurality of annular connecting members encircling the axis of said alined elements and contained within said casing, and means for securing the casing to said members for common rotary movements and relative axial movements, said members and elements having coöperating oppositely inclined faces for transmitting differential movements to the latter when said members are driven with the casing in either rotary direction.

6. In a differential apparatus, two opposing axle-head members and a reciprocating connecting member, said connecting member having a number of angularly disposed slide cam faces on its opposite ends and said axle-head members having a like number of angularly disposed slide cam faces co-acting therewith, and other connecting members having cam faces similar to the cam faces of the first mentioned connecting member and adapted to engage said cam faces on said axle-head members, each of said connecting members being held in a definite angular position relatively to each of the others and all of them being capable of relative reciprocation so as to act on each head member successively and produce therewith a differential driving action when said axle-head members are unequally retarded.

7. In a differential apparatus, two opposing axle-head members and a reciprocating annular connecting member, said connecting member having similarly angularly disposed slide cam faces on its opposite ends, and said axle-head members having angularly disposed slide cam faces co-acting therewith, and other reciprocating connecting members each having on its respective ends cam faces adapted to engage said cam faces on said axle-head members and held in a definite angular position relatively to said first mentioned connecting member so that the high points on the two ends of the group of connecting members are in reversed order, said connecting members producing through their successive reciprocation relatively to one another a differential driving action when said axle-head members are driven thereby and unequally retarded.

8. In a differential apparatus, a rotatable casing, two driven toothed axle-heads mounted therein, and driving connections between the casing and the axle-heads, said connections consisting in a plurality of concentrically disposed annular members having teeth upon their opposite ends, said ends being alternately engageable with said toothed heads.

9. In a differential apparatus, a rotatable casing, two driven toothed elements mounted therein, and driving connections between the casing and the elements, said connections consisting in a plurality of concentrically arranged annular members having teeth upon their opposite ends and being alternately engageable with said toothed elements, the teeth in the ends of the various members being arranged in evenly spaced radial relation.

Signed at Seattle, Washington, this 9th day of January, 1917.

HARRY M. PATCH.

Witnesses:
E. PETERSON,
HORACE BARNES.